United States Patent [19]

Liaw

[11] 4,218,320
[45] Aug. 19, 1980

[54] LUBRICATING OIL FILTER DEVICE

[76] Inventor: Sung M. Liaw, 379, Section 4, Hsing Yi Rd., Taipei, Taiwan

[21] Appl. No.: 8,175

[22] Filed: Jan. 31, 1979

[51] Int. Cl.² ............................................. B01D 35/06
[52] U.S. Cl. ................................................... 210/223
[58] Field of Search ................... 210/223, 222; 55/100; 209/212, 213, 215, 223 R, 223 A, 224

[56] References Cited

U.S. PATENT DOCUMENTS 3,035,703  5/1962  Pall ........................................ 210/223

*Primary Examiner*—Frank Sever
*Attorney, Agent, or Firm*—Shoemaker and Mattare, Ltd.

[57] ABSTRACT

This invention relates to a lubricating oil filter device, more particularly to an attached accessory of either electromagnet or permanent magnet wound around the main body of the lubricating oil filter device. When the oil with fine iron particles flows through the main body, the fine iron particles will not penetrate the rolled filter paper but will be attracted by the magnetic force onto the inner wall of the main body so as to lengthen the duration of the filter paper.

1 Claim, 3 Drawing Figures

U.S. Patent  Aug. 19, 1980  4,218,320

LUBRICATING OIL FILTER DEVICE

BACKGROUND OF THE INVENTION

As far as the lubricating system of automobile is concerned, the general knowledge is that the friction in the cylinder would bring about the penetration of the fine iron particles into the lubricating oil. The failure to defecate the unexpected fine iron particles would be followed by the incomplete combustion of the fuel in the cylinder and further the leakage of combustioned air. A conventional method to solve this problem is to provide an oil filter device for the purpose of filtering the circulated lubricating oil in the lubricating system. However, the conventional lubricating oil filter device only teaches the application of a rolled paper filter coaxial in relation to the main body of the lubricating oil filter device. The rolled paper filter is provided between the main body thereof and a magnet which is provided within the main body. When the filtering of lubricating oil is in progress, the lubricating oil flows into the oil passage provided between the rolled paper filter and the main body thereof. Then, the lubricating oil flows outside from the outlet of the oil filter device. Due to the fact that the lubricating oil passes at first through the rolled paper filter during filtering, the fine iron particles would have an ill effect on the paper filter. Further due to the fact that the magnet is attached on to the inner wall of the paper filter and the passage for the lubricating oil to flow is not spacious, the more the fine iron particles are attracted on to the magnet, the less would be the capacity of the lubricating oil filter device. Besides, the accumulated fine iron particles would be peeled off in masses by the oil current and delivered to the engine. Hence, more damages may occur if this device has been in use for a long time. Therefore, the conventional lubricating oil filter device has still some defects and must be improved accordingly. It is the main object of this invention to improve the above defect, and furthermore to a new device of lubricating oil filter for practical use.

The construction, features and functions of this invention will be explained more fully with reference to the drawings attached herewith as follows wherein.

DETAILED DESCRIPTION OF THIS INVENTION

Figure 1:
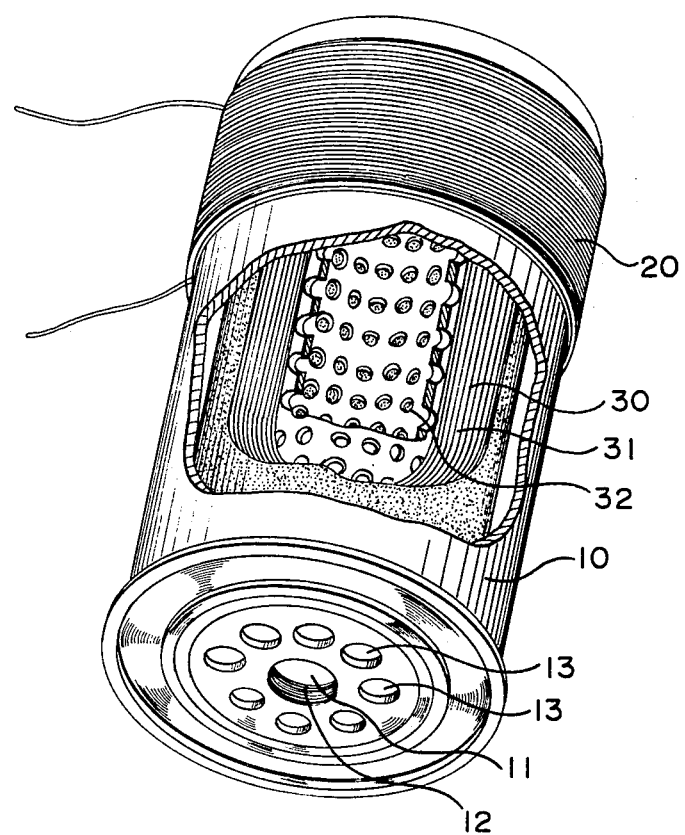
FIG. 1 is an oblique view of this invention, partly taken away to better show the construction thereof.

Referring to FIG. 1, this invention is provided with a can body 10 and one center outlet hole 11 threaded with female screw 12 for the oil pipe to screw thereupon. A set of rolled filter paper 30 is formed as a hollowed column and installed inside said can body 10 to keep the fine iron particles from flowing therein. Said oil filter paper 30 made of the paper 31 of wrinkled type is also surported by a hollowed metal column 32 with many holes on its side wall, wherein one end of said hollowed metal column 32 is the outlet hole 11. Onto the outer side of said can body there is a set of winding or a hollowed permanent magnet 20. Said winding 20 is usually made by winding on a circular frame and then put onto said can. When the wire is energized, said can body 10 will be provided with magnetic force to attract the fine iron particles iron particles in the lubricating oil onto the inner wall of said can body 10. Besides, some fine particles which can be attracted between the can body 10 and the rolled paper filter 30. The hollowed metal 32 is also magnetized by the winding 20 so that it also can attract some fine particles. Meanwhile, it is comparatively easier for the winding 20 to be examined and repaired. Since the winding 20 is wound onto the outer side of said can body 10 and has no touch with the lubricating oil, the duration this invention is therefore lengthened.

Usually, engine and lubricating oil pump is stopped before the power supply is in an off state. Therefore, there is no worry that the fine iron particles would flow into the engine when the winding loses its energy. Starting a car, the process is reverse so that there is also no problem in this respect.

Figure 2:
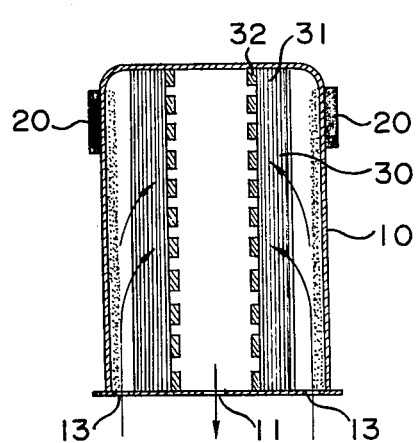
FIG. 2 is a fragmentary vertical sectional view illustrating the inner structure and outer attached windings or magnet of this invention.
Figure 3:
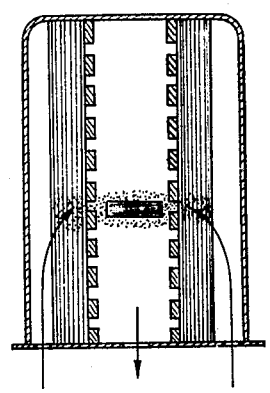
FIG. 3 is a fragmentary vertical sectional view of the conventional device.

FIG. 2 shows a vertical secontional view of this invention illustrating the oil flow path when the lubricating oil is filtered. According to FIG. 3, we can see that the magnet of the inventional oil filter device will easily be fully loaded and the rolled filter paper will be in an ill state very quickly.

In this invention, the magnetic force is very strong and the area for the fine iron particles to be adhered upon is very large. Therefore, the luricating oil can be kept form deteriorating so as to lengthen the duration of the engine.

Since the lubricating oil filter device according to this invention makes the smooth operation of engine attainable, the fuel can be in a complete combustion so that the combustioned air is beyond the possibility to bring about the pollution. Especially, these characteristics can be easily seen by driving in a new car. In summary of the above description, it is obvious that this invention is really an improvement to the conventional lubricating oil filter device. The foregoing embodiment is thus described where the car is concerned car. However, this invention can be further used in a lathe, a machinery set etc, the effect of which is the same as used in a car.

What I claim is:

1. A lubricating oil filter device comprising:
   a cylindrical housing through which lubricating oil passes, said housing having an outer wall which is impermeable to lubricating oil and which is formed of a material which can be magnetized, said housing having an inlet defined therein and an outlet defined therein, said inlet and outlet being positioned so that lubricating oil flows longitudinally of said housing in passing through said housing;
   a filter medium located within said housing so that lubricating oil passing through said housing flows parallel to said housing outer wall for a substantial portion of the length of said outer wall and flows so that such lubricating oil flows between said housing outer wall and said filter medium coaxially of said housing as well as through said filter medium, said filter medium removing particles from lubricating oil passing through said housing;
   removing means for removing fine iron particles from lubricating oil passing through said housing, said removing means including an electric winding wound around the outside of said housing, means for connecting said winding to an electric system of an automobile to be energized thereby, said energized winding magnetizing said housing to attract fine iron particles to said housing outer wall, said removing means further including a hollow metal column located inside said filter medium, said metal column being dimensioned and designed for supporting said filter medium and being formed of material which can be magnetized and having a multiplicity of holes defined therein through which lubricating oil can pass, said column being magnetized by said energized winding to attract any iron particles still remaining in lubricating oil after such lubricating oil has passed through said filter medium; said electric winding magnetizing said housing outer wall and said column in a manner such that most of the fine iron particles in lubricating oil passing longitudinally through said housing are attracted to said housing outer wall to form a coating on said housing outer wall, said energized winding magnetizing said coating so that further fine iron particles will be separated from lubricating oil passing through said housing and will be attracted to said coating whereby fine iron particles are removed from lubricating oil passing through said housing by said magnetized housing outer wall, said magnetized coating, said filter medium and said magnetized column.

* * * * *